A. ANDREE.
NOTE READING DEVICE.
APPLICATION FILED AUG. 5, 1916.
1,265,720. Patented May 14, 1918.
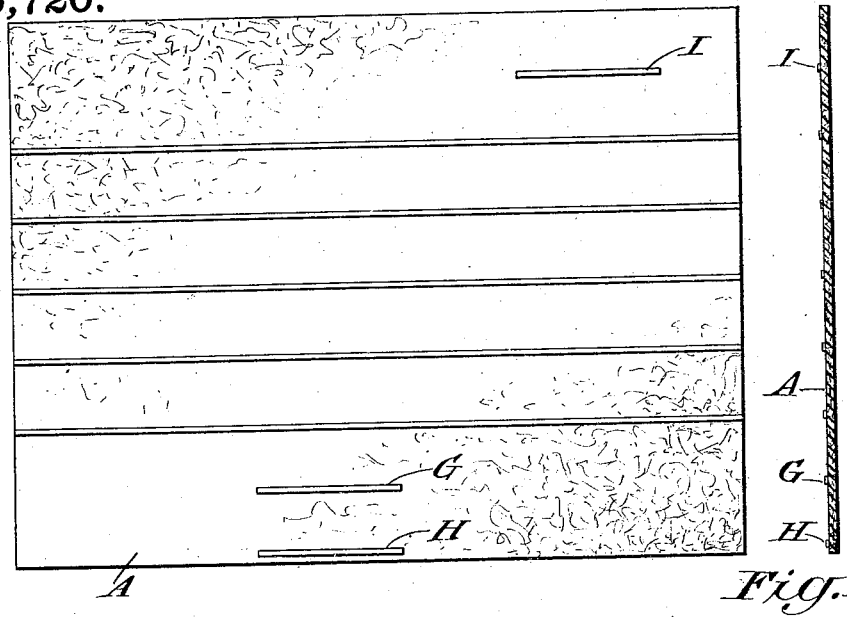
Fig. 1.
Fig. 1.ᵃ
Fig. 2. Fig. 3.
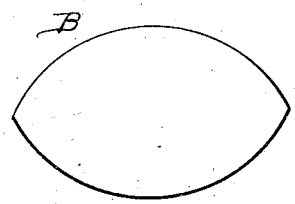 
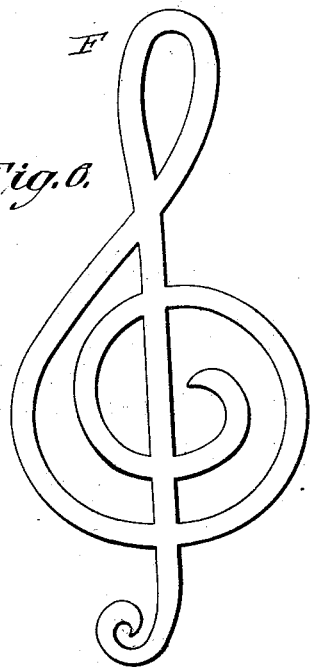
Fig. 6.
Fig. 4. Fig. 5.
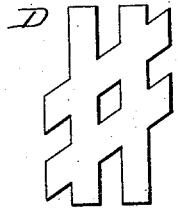 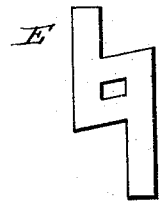
Inventor
Armida Andree

UNITED STATES PATENT OFFICE.

ARMIDA ANDREE, OF MANISTEE, MICHIGAN.

NOTE-READING DEVICE.

1,265,720.  Specification of Letters Patent.  Patented May 14, 1918.

Application filed August 5, 1916. Serial No. 113,401.

*To all whom it may concern:*

Be it known that I, ARMIDA ANDREE, a citizen of the United States, residing at Manistee, in the county of Manistee and State of Michigan, have invented a new and useful Improvement in Note-Reading Devices, of which the following is a specification.

This invention relates to music charts for teaching note reading by means of movable figures and has for its object to simplify note reading for beginners and aid in rapid sight reading.

I attain the object by the device illustrated in the accompanying drawing in which—

Figure 1 shows the chart; Fig. 1ª is a vertical section of it; Figs. 2 to 6 show musical symbols to be applied to the chart.

A represents a board covered with flannelet—dimensions 25 in. x 36 in. (or larger). Five lines on board represent a large staff and are five strips of ribbon or tape placed 3½ or 4 in. apart. B, C, D, E, F represent respectively a note, flat, sharp, natural and clef made of blotting paper. G, H and I are separate, movable strips of tape which represent leger lines. There may be any number of these strips.

There are as many notes, flats, sharps etc., as the musical phrases to be taught require. The figures being made of blotting paper, stick to the flannelet, thus making it possible to change quickly from one key to another.

The charts used hitherto have consisted of small figures and staffs with lines placed close together. Notes of different time values have been represented.

Instead of small figures and staff lines placed close together, I employ large figures and one large staff with lines placed wide apart.

Instead of complicated figures representing notes of different time values, I employ simply the large note heads, eliminating entirely time values for the reason that note heads are sufficient for practice in sight reading and the consideration of time values interferes with rapid work.

I claim:

A music chart made of flannelet which has upon it one large staff consisting of movable strips of tape, and figures constructed of blotting paper, which adhere to the flannelet.

(MISS) ARMIDA ANDREE.

Copies of this patent may be obtained for five cents each, by addressing the "Commissioner of Patents, Washington, D. C."